(12) United States Patent
Borgaonkar et al.

(10) Patent No.: US 7,979,795 B2
(45) Date of Patent: Jul. 12, 2011

(54) SYSTEM AND METHOD FOR INPUTTING SYLLABLES OF A PHONETIC SCRIPT INTO A COMPUTER

(75) Inventors: Shekhar Ramachandra Borgaonkar, Karnataka (IN); Ajay Bhaskarabhatla, Pittsburgh, PA (US); Prashanth Anant, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 897 days.

(21) Appl. No.: 11/572,819

(22) PCT Filed: Aug. 2, 2004

(86) PCT No.: PCT/US2004/024802
§ 371 (c)(1),
(2), (4) Date: Nov. 26, 2007

(87) PCT Pub. No.: WO2006/022668
PCT Pub. Date: Mar. 2, 2006

(65) Prior Publication Data
US 2008/0120540 A1      May 22, 2008

(51) Int. Cl.
*G06F 17/21* (2006.01)
(52) U.S. Cl. ........ 715/268; 715/863; 345/169; 345/179; 382/185; 382/186; 382/187; 382/189; 382/209
(58) Field of Classification Search .................. 345/169, 345/179; 382/185, 186, 187, 189, 209; 715/268, 715/863–866
See application file for complete search history.

(56) References Cited

U.S. PATENT DOCUMENTS

| | | | |
|---|---|---|---|
| 5,583,543 A * | 12/1996 | Takahashi et al. | 345/173 |
| 5,724,449 A | 3/1998 | Cornerford | |
| 5,742,705 A * | 4/1998 | Parthasarathy | 382/185 |
| 6,094,197 A | 7/2000 | Buxton et al. | |
| 6,480,587 B1 | 11/2002 | Rao et al. | |
| 7,721,222 B1 * | 5/2010 | Shaik | 715/773 |
| 2002/0196978 A1 | 12/2002 | Hawkins et al. | |
| 2003/0193478 A1 | 10/2003 | Ng et al. | |
| 2003/0214531 A1 | 11/2003 | Chambers et al. | |
| 2004/0164951 A1 * | 8/2004 | Lun Pun et al. | 345/156 |
| 2006/0126936 A1 * | 6/2006 | Bhaskarabhatla | 382/187 |
| 2008/0221866 A1 * | 9/2008 | Katragadda et al. | 704/8 |
| 2009/0138830 A1 * | 5/2009 | Borgaonkar et al. | 715/863 |

OTHER PUBLICATIONS

Shanbhag, Rao, and Joshi, "An Intelligent Multi-layered Input Scheme for Phonetic Scripts", 2002, ACM, Symposium on Smart Graphics, Jun. 11-13, 2002, Hawthorne, NY, USA, pp. 35-38.*
Shrinath Shanbhag; Durgesh Rao; R. K. Joshi, An Intelligent Multi-layered Input Scheme for Phonetic Scripts.

* cited by examiner

*Primary Examiner* — Stephen S Hong
*Assistant Examiner* — I-Chan Yang

(57) ABSTRACT

A practical and natural way of inputting syllables of scripts into a computer. In one example embodiment, This is achieved by selecting a base character from a set of characters using a digitizing tablet [1216]. The selected base character is then modified by drawing one or more natural handwritten modifying gestures to form a current desired syllable. An associated data of the formed current desired syllable is then inputted into a gesture-keypad-engine [1230] via the digitizing tablet [1216] upon completion of the drawing of the one or more natural handwritten modifying gestures. The gesture-keypad-engine [1230] then produces a current candidate syllable as a function of the inputted associated data of the formed current desired syllable. The produced current candidate syllable is then displayed on a display device [540].

18 Claims, 11 Drawing Sheets

SYSTEM AND METHOD FOR INPUTTING SYLLABLES OF A PHONETIC SCRIPT INTO A COMPUTER

TECHNICAL FIELD OF THE INVENTION

The present invention relates generally to a user interface in a computer system, and more particularly relates to data entry into a computer.

BACKGROUND OF THE INVENTION

Generally, data entry into computers is performed using keyboards. The complexity and size of keyboards depend on the number and type of characters present in a script. Typically, phonetic scripts, such as Indic, Sinhalese, Burmese, Thai, Vietnamese, and the like tend to have large and/or complex character sets. Such scripts can present great difficulties in the design as well as use of these keyboards. For example, Indic scripts have nearly 30 to 40 consonants, 12 to 15 vowels, and about 12 to 15 phonetic modifiers and half consonant modifiers. It can be envisioned that various combinations of these consonants, vowels, and modifiers can result in forming a significantly large character set. To accommodate such a large character set, the amount of keyboard area required can be very large and would be impossible to build or use such a keyboard as a practical matter.

As a result, the current techniques employ either a keyboard where several key strokes may be required to enter a desired syllable or a character recognition technique that recognizes entire characters. The keyboard approach provides incomplete visibility of the entire character map at any given point of time. In addition, these keyboards are non-intuitive and can require extensive practice period for proficiency. Further, character entries using such keyboards tend to be very slow. Furthermore, the increasing demand for smaller and smaller devices is driving keyboard designs toward a smaller one-handed keypad making it impractical to use keyboards accommodating such large character sets. This can pose a severe problem for handheld devices, such as PDAs, which currently use graffiti keypads or T9 keyboards.

The character recognition approach requires entering characters using a pen to naturally write an entire character on a graphics tablet. In this approach, the character recognition technique attempts to find the character that most closely matches the strokes entered on the tablet. Most of the current handwritten character recognition techniques recognize neatly printed characters. However, the recognition accuracy of handwritten characters in scripts having complex shapes, such as Indic, Arabic, and the like is significantly poor.

Currently, handwritten character recognition techniques are not robust enough to handle the different writing styles of an arbitrary user of such characters in phonetic scripts and hence tend to have significantly lower recognition accuracy. In addition, the current handwritten character recognition techniques are not capable of handling characters of scripts, such as Indic, Arabic, South-east Asian, and the like, which have complex shapes and require writing these shapes neatly by using strokes in a particular direction and order. Further, the characters in phonetic scripts are generally highly cursive in nature at the syllable level, which makes it even more difficult for the current handwritten character recognition techniques to recognize such handwritten characters.

SUMMARY OF THE INVENTION

According to a first aspect of the invention there is provided a method for inputting a desired shape into a computer, the method comprising the steps of:

a) locating a base shape from a set of shapes using a digitizing tablet;
b) drawing one or more modifying gestures substantially around the located base shape using the digitizing tablet to form a desired shape;
c) inputting an associated data of the formed desired shape upon completion of the drawing of the one or more modifying gestures into a gesture-keypad-engine via the digitizing tablet;
d) producing a candidate shape by the gesture-keypad-engine; and
e) outputting the candidate shape.

Preferably, the above outlined steps are repeated to form and display a next candidate shape. Preferably, the next candidate shape along with the current candidate shape is displayed such that the current candidate shape is cursively connected to the next candidate shape.

According to a second aspect of the invention there is provided an article including a storage medium having instructions that, when executed by a computing platform, result in execution of a method for syllable input, the method comprising the steps of:

a) locating a base shape from a set of shapes using a digitizing tablet;
b) drawing one or more modifying gestures substantially around the located base shape using the digitizing tablet to form a desired shape;
c) inputting an associated data of the formed desired shape upon completion of the drawing of the one or more modifying gestures into a gesture-keypad-engine via the digitizing tablet;
d) producing a candidate shape by the gesture-keypad-engine; and
e) outputting the candidate shape.

According to a third aspect of the invention there is provided an apparatus for syllable input, the apparatus comprising:

a) a digitizing tablet that locates a character from a set of characters and modifies the located character by drawing one or more natural handwritten modifier strokes to form a desired syllable;
b) a gesture-keypad-engine coupled to the digitizing tablet that is responsive to the located character and the drawn one or more natural handwritten modifier strokes, wherein the gesture-keypad-engine produces a current candidate syllable upon completion of the drawing of the one or more natural handwritten modifier strokes; and
c) a display device coupled to the gesture-keypad-engine that displays the produced current candidate syllable.

According to a fourth aspect of the invention there is provided a system for syllable input, the system comprising:

a) a processor;
b) a memory coupled to the processor;
c) a remote computer;
d) a network interface, wherein the processor and the remote computer are operatively connectable via the network interface;
e) a user input device coupled to the network interface for selecting a character from a character set and to modify the selected character by entering one or more natural handwritten modifier strokes;
f) a gesture-keypad-engine coupled to the user input device via the network interface that is responsive to the selected character and the entered one or more natural handwritten modifier strokes, wherein the gesture-keypad-engine produces a current candidate syllable upon completion of the entering of the one or more natural handwritten modifier strokes; and g) an output device coupled to the gesture-keypad-engine that displays the produced current candidate syllable.

Preferably, the electronic tablet has a flat surface with a defined active area. Preferably, the defined active area has a map of a gestureboard including characters from a desired script having a large character set. Preferably, a user can locate a character by placing the stylus over one of the characters on the gestureboard. Preferably, the user can draw the one or more natural handwritten modifier strokes around the located character to form the current desired syllable. Preferably, upon completion of the drawing of the one or more natural handwritten modifier strokes the electronic tablet sends digital data associated with the formed current desired syllable to the gesture-keypad-engine.

BRIEF DESCRIPTION OF THE DRAWINGS

Embodiments of the invention will now be described, by way of example only, with reference to the accompanying drawings in which.

DETAILED DESCRIPTION OF THE INVENTION

Figure 1:
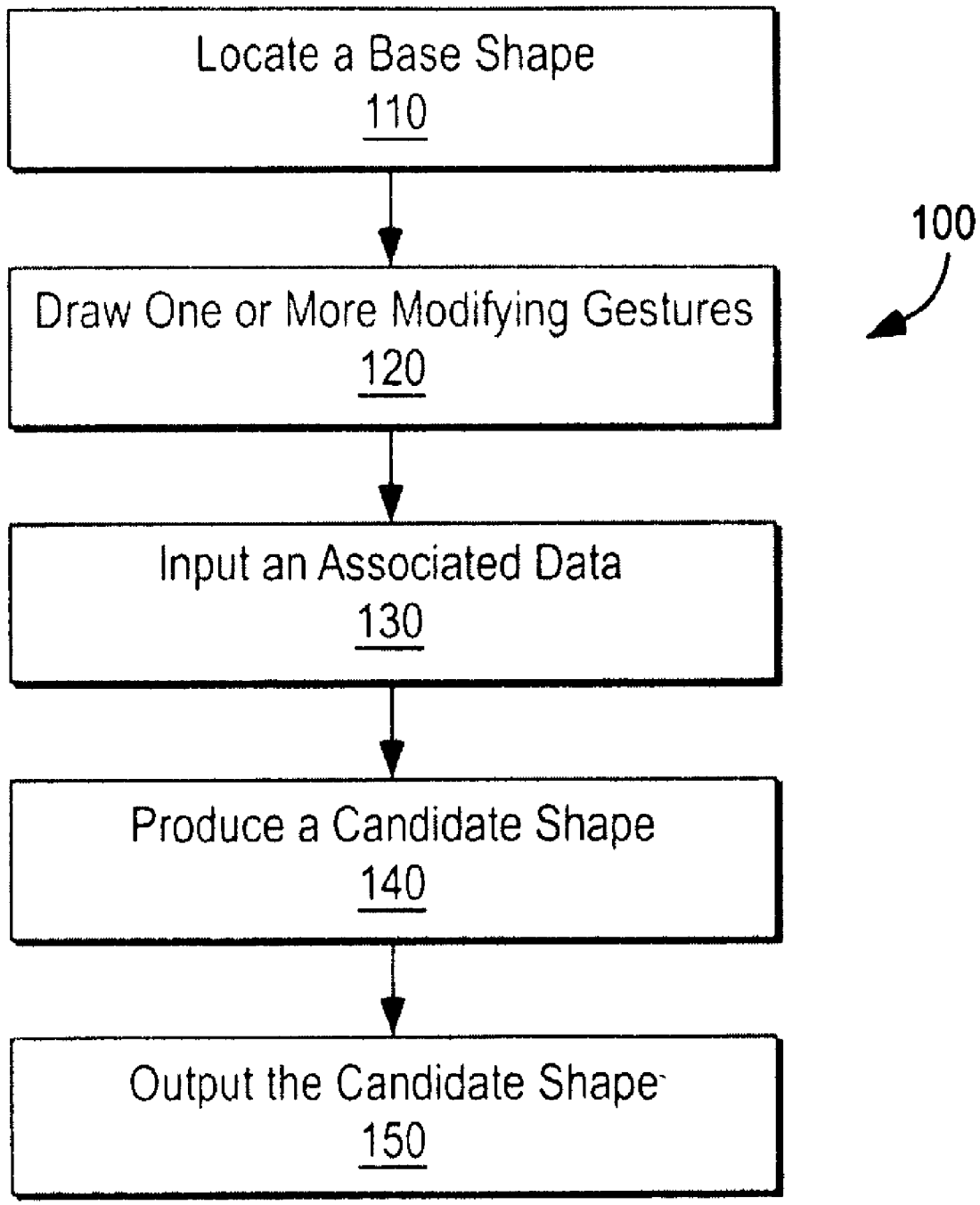
FIG. 1 is a flowchart illustrating an example method of inputting a desired shape into a computer according to an embodiment of the present invention.

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "shape recognizer" means a recognition algorithm that classifies input patterns into one of a plurality of classes, the parameters and/or structure of such a classifier being determined from the statistics of the input patterns. Examples of algorithms used in the handwritten character recognizer include neural networks, radial basis functions, classification and regression trees, parametric Bayesian models, mixtures of experts, polynomial classifiers, and the like. Other examples of handwritten character recognizers are obvious to those skilled in the art of pattern recognition.

The terms "character recognizer", "handwritten character recognizer", "handwritten character recognition engine", "online handwritten character recognition engine", "handwritten gesture recognition engine" and "handwritten shape recognition engine", and "shape recognizer" are used interchangeably throughout the document. All of these terms refer to shape recognition engine operating on a base character and a linguistic data base to recognize and produce a desired syllable or character.

The term "phonetic script" refers to scripts, such as Indic, which are vowel dominant. In these scripts, the consonant in their pure form do not include the vowel sounds. Vowels have to be attached to the consonants to make them complete. In a full consonant approach, the consonant is assumed to have the vowel attached to it by default. Grammatically, another vowel cannot be attached to it. One uses the matra forms of other vowels (i.e., modifiers, vowel signs, and so on) as a separate entity which are attached to the full consonant.

The term "digitizing tablet" refers to an input device for obtaining graphics input. It is connected to a computer and includes some form of a pen-like pointing device called a transducer. The tablet has a flat surface with a defined space, or active area, where the user can place a gesture character map of a desired phonetic script; the map can be an overlay. A pointing device is then used to pinpoint areas within the map, and the tablet sends associate character and/or modifier data to the gesture-keypad-engine. The flat surface along with the pen-like pointing device provides a more natural drawing motion for users to input data into a computer.

In the specification and claims herein, the word "pen" is used. When used in the specification and claims, this word shall mean a position designating device that is sensed by the input tablet or touchpad. For a standard graphics tablet, this is a special stylus, while for a standard capacitive touchpad, this is a finger. The special stylus can be used to draw or trace images, which are then converted to digital data that can be processed by the computer.

The term "character" refers to a member of alphabetic, logographic, and/or phonetic/syllabic character set, which includes syllables, alphabets, numerals, and punctuation marks. The term "syllable" refers to a unit of spoken language consisting of a single uninterrupted sound formed by a vowel, diphthong, or syllabic consonant alone, or by any of these sounds preceded, followed, or surrounded by one or more consonants.

Further, the terms "selecting a character from a set of characters" and "locating a character from a set of characters" are used interchangeably throughout the document. Furthermore, the terms "entering one or more natural handwritten modifier strokes" and "locating one or more natural handwritten modifier strokes" are used interchangeably throughout the document.

FIG. 1 illustrates an example method 100 of inputting shapes into a computer. At step 110, this example method 100 locates a base shape from a set of shapes using a digitizing tablet. At 120, one or more modifying gestures are drawn substantially over and/or around the located base shape using the digitizing tablet to form a desired shape.

At 130, an associated data of the formed desired shape is inputted into a gesture-keypad-engine via the digitizing tablet upon completion of the drawing of the one or more modifying gestures. In some embodiments, the associated data of the located base shape is inputted into the gesture-keypad-engine via the digitizing tablet upon inputting a selection gesture into the computer when the located base character does not need any modifying gestures.

At 140, a candidate shape is produced by the gesture-keypad-engine. Then at 150, the produced candidate shape is outputted. The outputted candidate shape can be transmitted using a communication channel, such as a radio wave, printed using a printer, pronounced in a speaker using text-to-speech engine, and/or displayed using a computer monitor.

Figure 2:
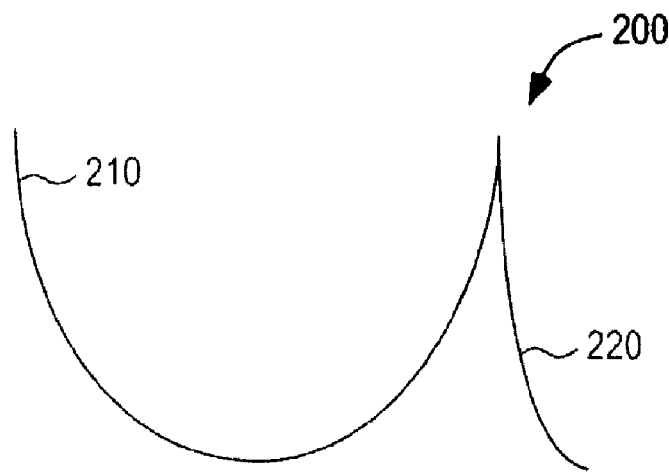
FIGS. 2-3 are schematic diagrams that illustrate inputting example shapes into a computer according to an embodiment of the present invention.

Referring now to FIG. 2, there is illustrated a schematic diagram of a displayed candidate shape 200 formed by using the steps described above with reference to FIG. 1. As shown in FIG. 2, a desired shape of letter "U" is formed by first locating a base shape 210 from a set of shapes and then modifying the located base shape 210 by drawing a modifying gesture 220 to produce the candidate shape of letter "U" 200.

Figure 3:
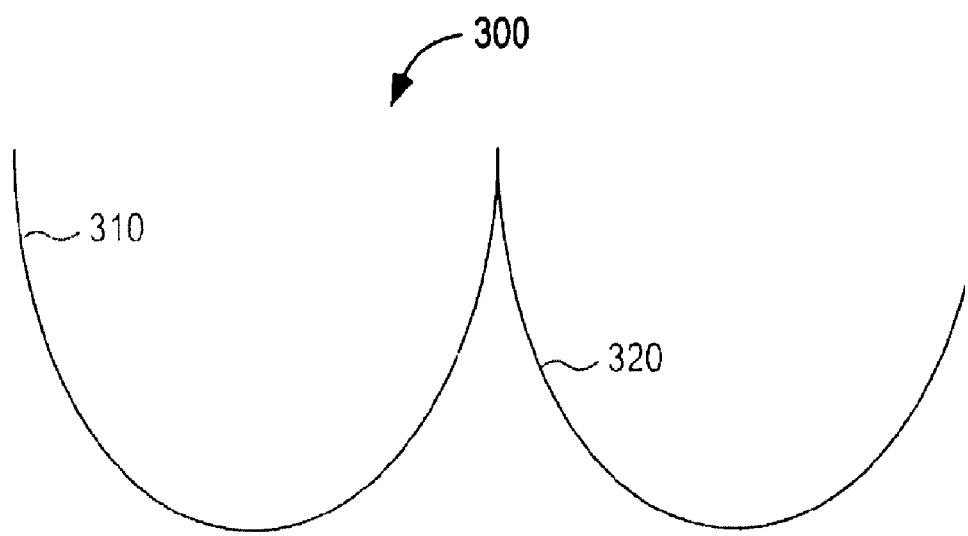

Referring now to FIG. 3, there is illustrated a schematic diagram of another displayed candidate shape "W" 300 formed, similarly to the candidate shape "U" shown in FIG. 1, by using the steps described above with reference to FIG. 1. As shown in FIG. 3, a desired shape of letter "W" is formed by first locating a base shape 310 from a set of shapes and then modifying the located base shape 310 by drawing a modifying gesture 320 to produce the candidate shape of letter "U" 300. It can be envisioned that by using the above-described technique many such combinations of shapes, forms, and/or characters can be formed. Also, it can be envisioned that by using only a few basic shapes, forms, and/or characters, a significantly large number of desired shapes, forms, and/or characters can be formed and inputted into a computer. This can considerably reduce the required keyboard area in a user input device.

The present invention is described in detail further below using Devanagiri text input, which typically presents unique challenges for data entry into a computer using a keyboard. The following describes a new scheme for entering syllables of phonetic scripts, such as Indic, using a gesture based keyboard approach. The technique uses a spatial location of a base character using a typical keyboard or other such user input devices followed by one or more natural pen gestures substantially over the base character position to modify the base character to produce a desired syllable. This is accomplished by inputting the above two inputs into a gesture-keypad-engine, which outputs a candidate syllable.

Figure 4:
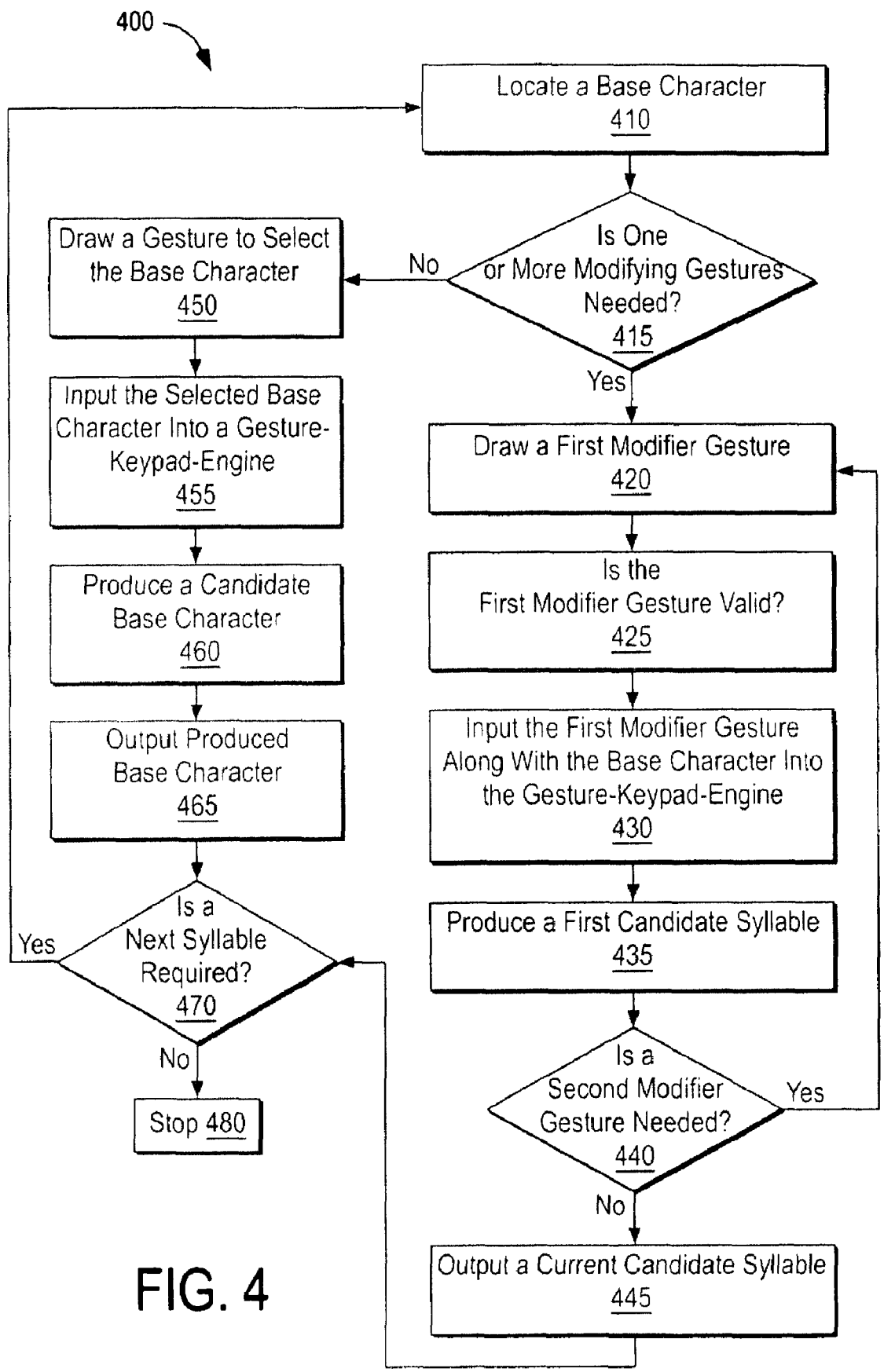
FIG. 4 is a flowchart illustrating an example method of inputting a desired syllable into a computer according to an embodiment of the present invention.

FIG. 4 illustrates an example method 400 of inputting syllables of a phonetic script into a computer. At step 410, this example method 400 locates a base character from a set of characters using a digitizing tablet to form a desired syllable.

Figure 5:
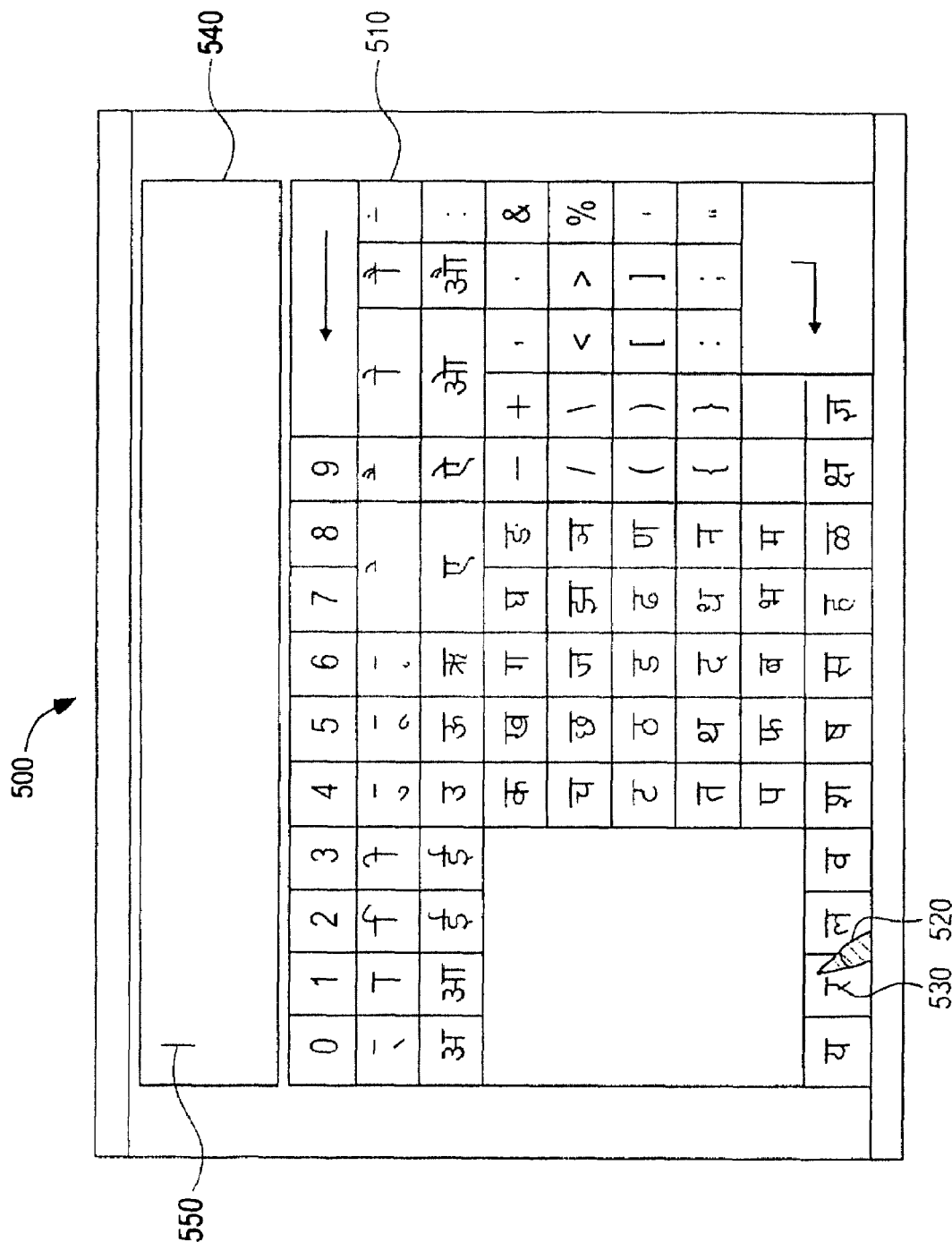
FIGS. 5-11 are screen shot representations that illustrate a sequence of syllable inputs performed according to an embodiment of the present invention.

Referring now to FIG. 5, there is illustrated a screen shot 500 of selecting a base character 530 using a stylus 520 on an electronic tablet 510 which has a flat surface with a defined active area. As shown in FIG. 5, the defined active area has a map of a gestureboard including syllables from an Indic script (Hindi) having a large character set. As shown in FIG. 5, a user places the stylus 520 over a base character and selects the desired base character 530 by placing the stylus 520 substantially over the desired base character 530. Also shown in FIG. 5, is a cursor 550 disposed in its initial starting position on a display device 540 disposed on the electronic tablet 510.

As illustrated in FIG. 5, the display device 540 shown in the screen shot 500 can be integrated into the digitizing tablet 500 and/or it can be operatively coupled to an external display device, such as a computer monitor, television (TV) screen, plasma display, liquid crystal display (LCD), and so on. It can be seen in FIG. 5, that the map of the gesture board 510 includes characters, such as vowels, vowel modifiers, consonants, consonant modifiers, English numerals, phonetic script numerals, and special characters. Special characters can include characters, such as space, back space, delete, and the like.

At 415, the method 400 checks whether one or more modifying gestures are needed for the located base character to form the desired syllable. In some embodiments, the located base character is modified by drawing the one or more modifying gestures substantially over and/or around the located base character to form a current desired syllable. In some embodiments, the located base character is modified with one or more natural handwritten modifying gestures using the digitizing tablet to form the current desired syllable.

Based on the determination at 415, if the one or more modifying gestures are needed for the located base character to form the desired syllable, the method 400 goes to act 420. At 420, the located base character is modified by drawing a first modifying gesture over the located base character.

At 425, the method 400 checks whether first drawn modifying gesture is a valid modifier. Based on the determination at 415, if the drawn modifying gesture is a valid modifier, then the method 400 goes to 430 and inputs an associated data of the located base character and the first drawing modifying gesture into a gesture-keypad-engine via the digitizing tablet upon completion of the drawing of the first modifying gesture. In some embodiments, the formed current desired syllable is inputted into a gesture-keypad-engine via the digitizing tablet upon completion of the drawing of the one or more modifying gestures.

At 435, the gesture-keypad-engine then produces a current candidate syllable based on the inputted associated data. At 440, the method 400 checks to determine if a second modifying gesture is needed to the produced candidate syllable. If a second modifying gesture is needed, then the method 400 goes to act 420 and repeats acts 420-440 to form a current candidate syllable. If the second modifying gesture is not needed, then the method 400 goes to act 445 and outputs the current candidate syllable.

At 470, the method 400 checks to determine if a next syllable is needed to form a word. If a next syllable is not needed to form the word, then the method 400 goes to act 480 and stops forming the next syllable to form the word as described above. If the next syllable is needed to form the word, the method 400 goes to act 410 and repeats acts 410-480 to select, modify, input and display the next syllable of the word. In some embodiments, the next candidate syllable is cursively connected to the current candidate syllable and displayed on a display device, such as a computer monitor.

Figure 6:
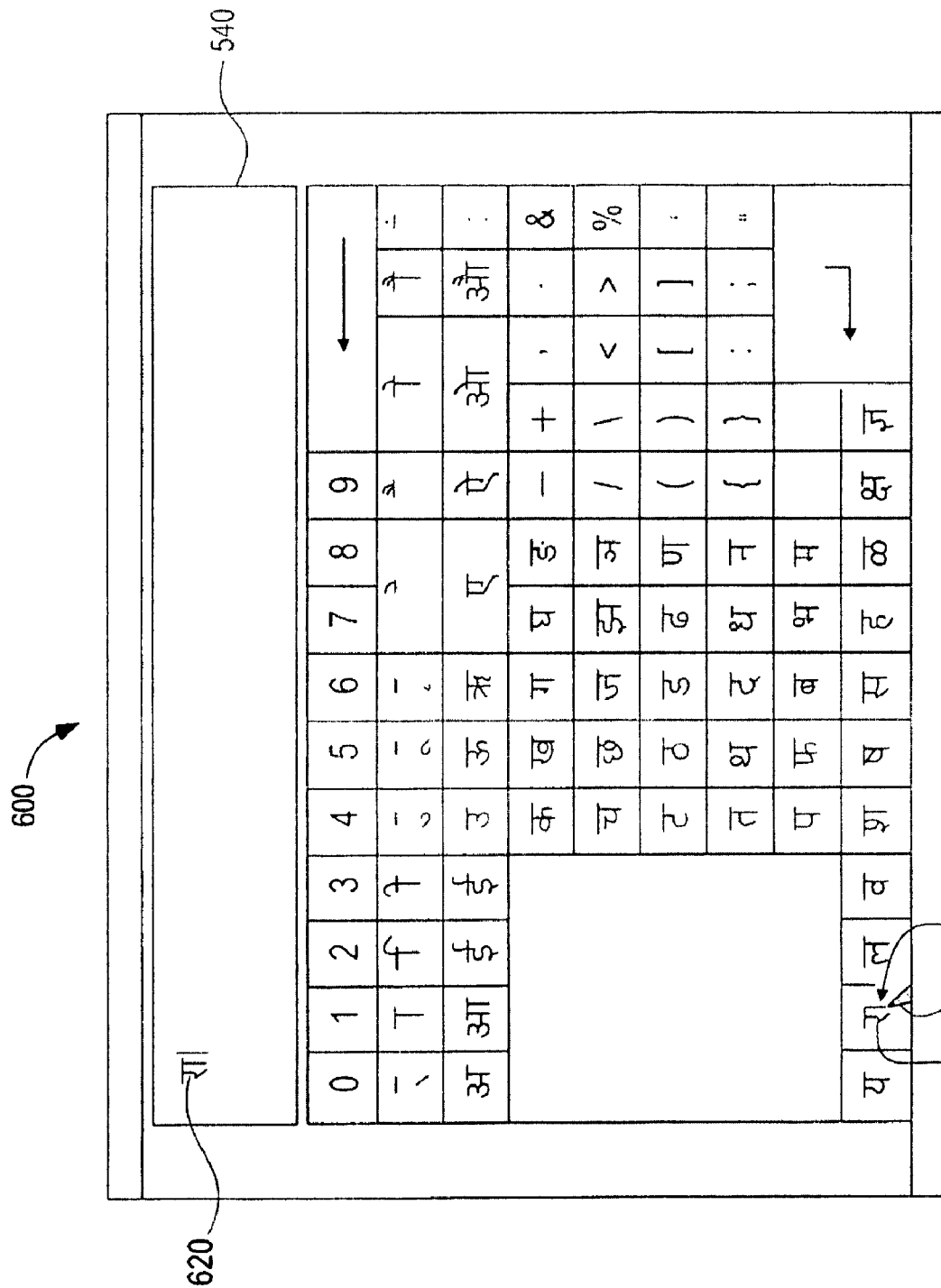

Referring now to FIG. 6, there is illustrated a screen shot 600 of drawing a desired modifying gesture 610 substantially over and/or around the located base character 530 to form a current desired syllable using the stylus 520. It can be seen in FIG. 6 that the drawn modifying gesture 610 is shown in a light contrasting color to give a feedback to the user of the modifier drawn around the located base character 530 and also to give a feeling of natural pen gesture, i.e., to give a natural feeling of handwriting to facilitate easier entry of desired one or more modifying gestures over the located base character 530.

As shown in FIG. 6, upon completion of the drawing of the desired modifying gesture 610 substantially over and/or around the located base character 530, the associated data of the current desired syllable is inputted into a gesture-keypad-engine (not shown). The gesture-keypad-engine then produces a current candidate syllable. The produced current candidate syllable 620 is then displayed on the display device 540.

Figure 7:
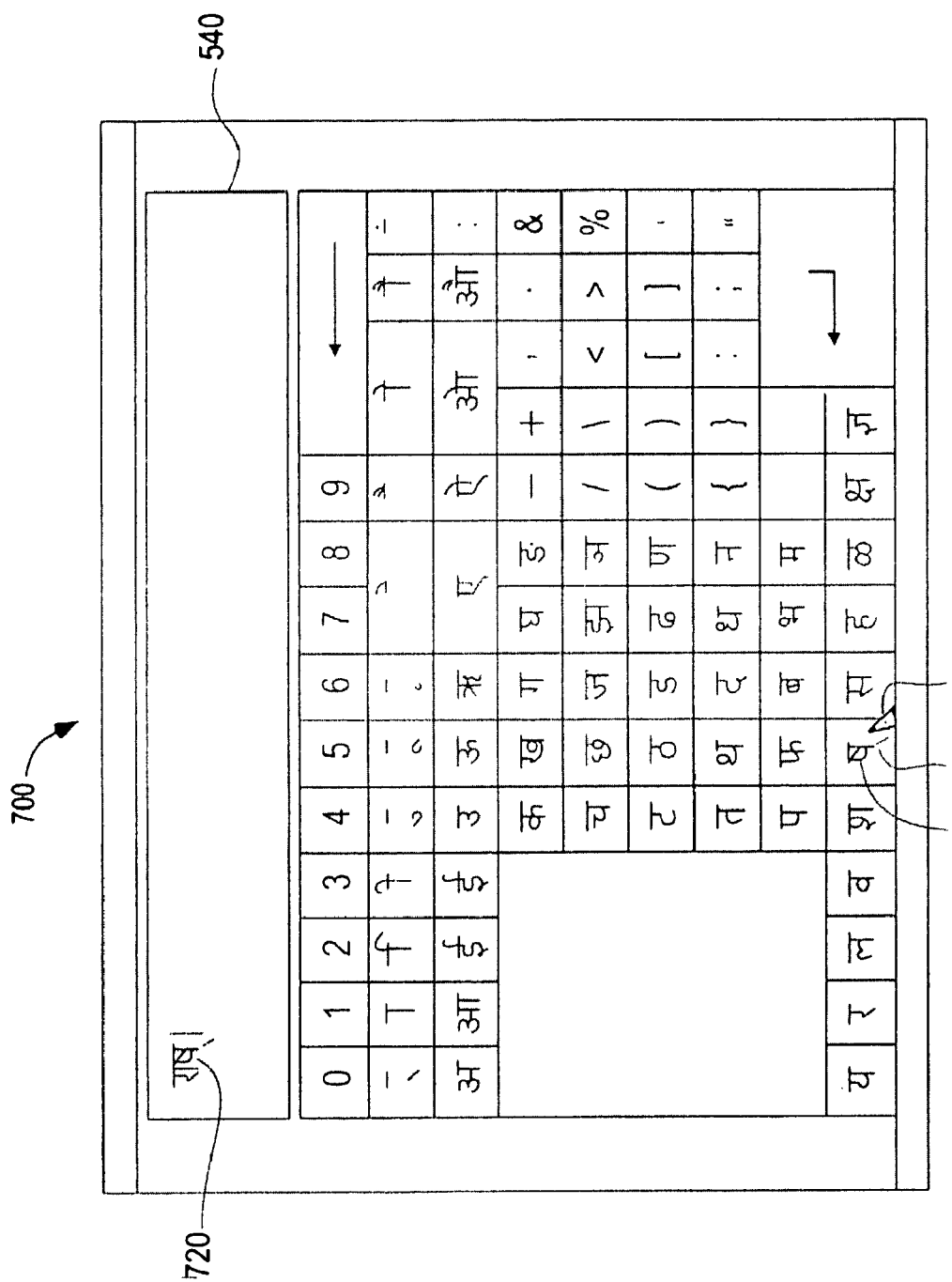
Figure 8:
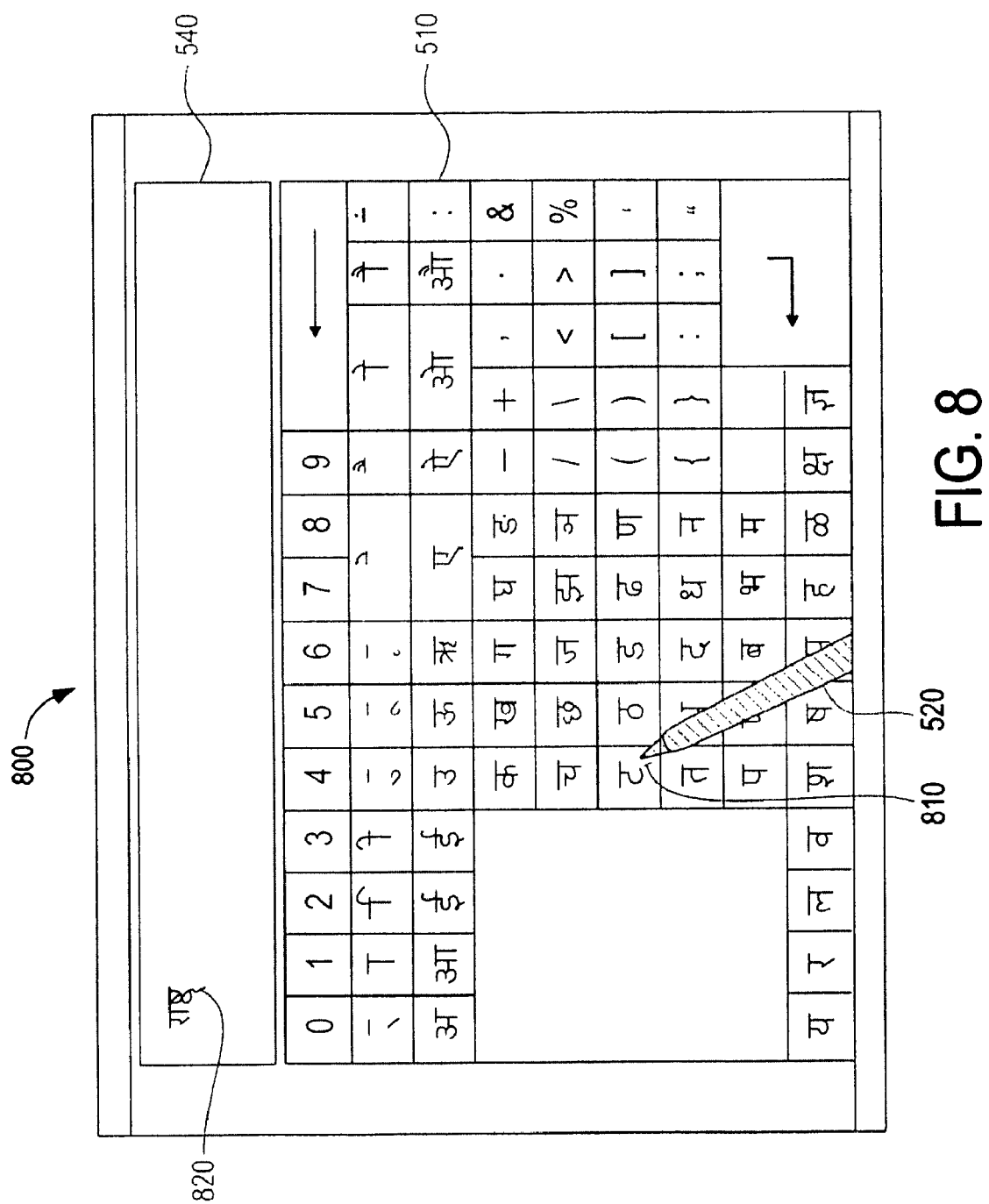
Figure 9:
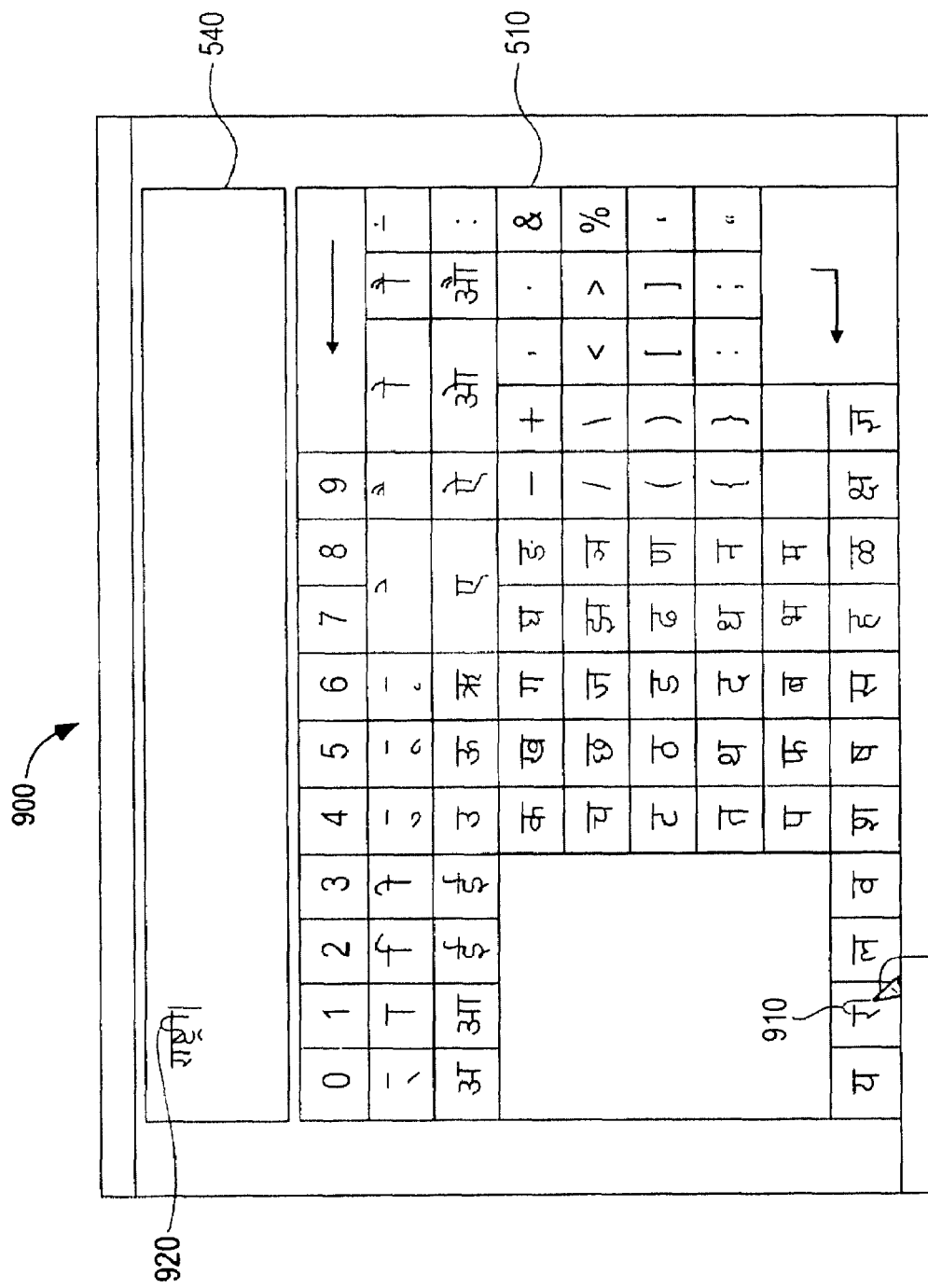

Referring now to FIGS. 7-9, there is illustrated screen shots 700-900 of selecting a next base character 705, by sequentially drawing one or more modifying gestures 710, 810, and 910, and progressively inputting the base character 705 along with the drawn one or more modifying gestures 710, 810, and 910 into the gesture-keypad-engine to continuously produce next candidate syllables 720, 820, and 920, respectively. As shown in FIGS. 7-9, the produced next candidate syllables 720, 820, and 920 are displayed progressively on the display device 540 until the next desired syllable 920 is formed. It can be seen in FIGS. 7-9, that while drawing the one or more modifying gestures 710, 810, and 910, the drawn portion of the modifying gestures 710, 810, and 910 are shown in a light contrasting color to facilitate the natural pen gesture. Also shown in FIGS. 7-9, is the next candidate syllable cursively connected with the current candidate syllable.

In these embodiments, based on the determination at 415, if one or more modifying gestures are not needed, the method 400 goes to act 450 and draws a gesture to select the base character. At 455, an associated digital data of the located base character is inputted into the gesture-keypad-engine upon drawing the gesture to select the base character. At 460, a current candidate syllable is produced based on the inputted associated digital data of the base character. At 465, the produced current candidate syllable is displayed and goes to act 470.

At 470, the method 400 checks to determine if a next syllable is needed to complete the word. If so, then the method 400 goes back to act 410 to select a next base character. If not, the method 400 goes to act 480 and stops.

Figure 10:
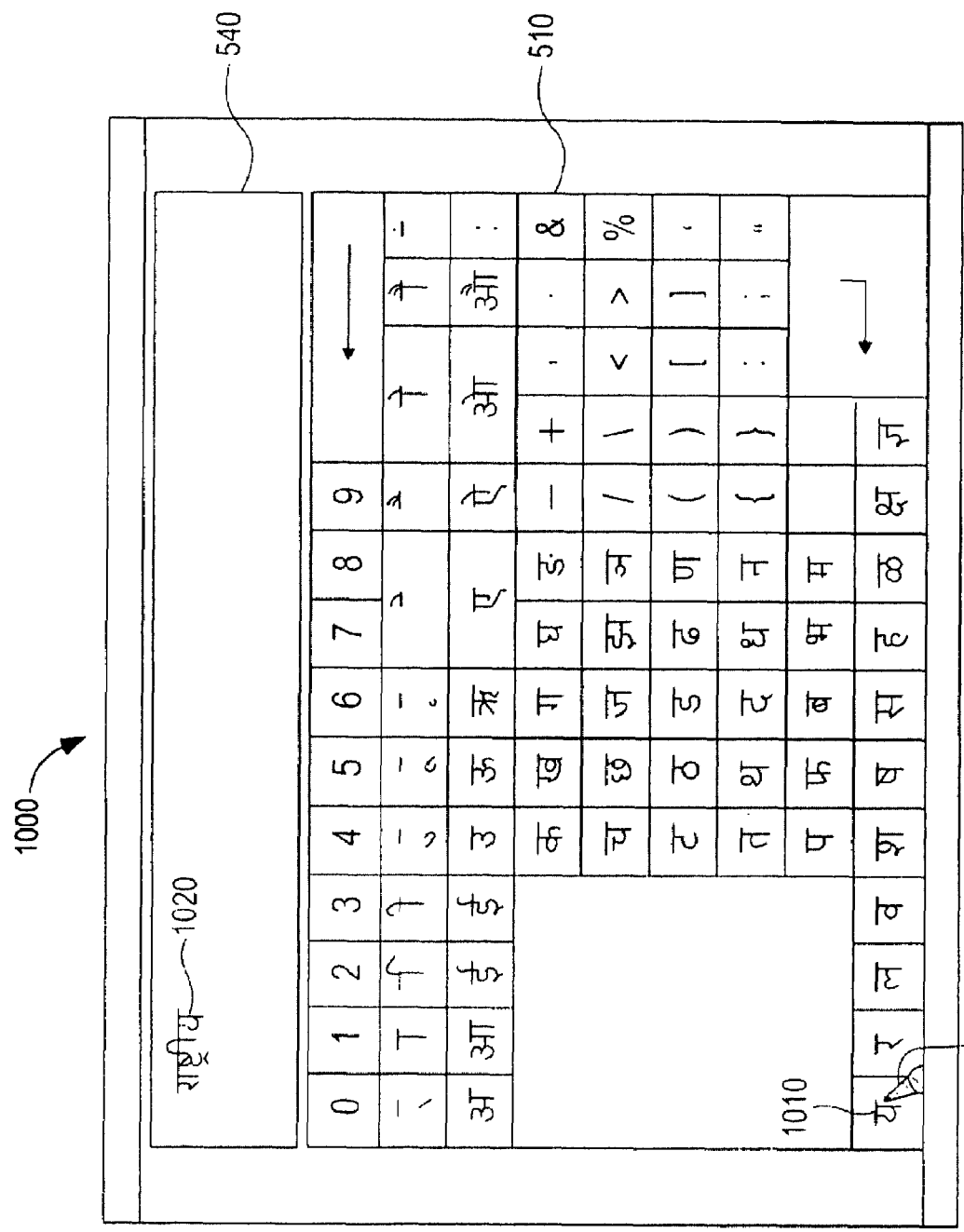

Referring now to FIG. 10, there is illustrated a screen shot 1000 of locating a next base character 1010 on the map of the gestureboard 510 and gesturing down on the next character 1010 using the stylus 520 to select and input the associated data into the gesture-keypad-engine. Upon completion of the inputting of the associated data of the located base character, the next base character 1010 is displayed on the display device 540, such as the one shown in FIG. 5 and/or on any other display device connected to the electronic tablet 510.

Figure 11:
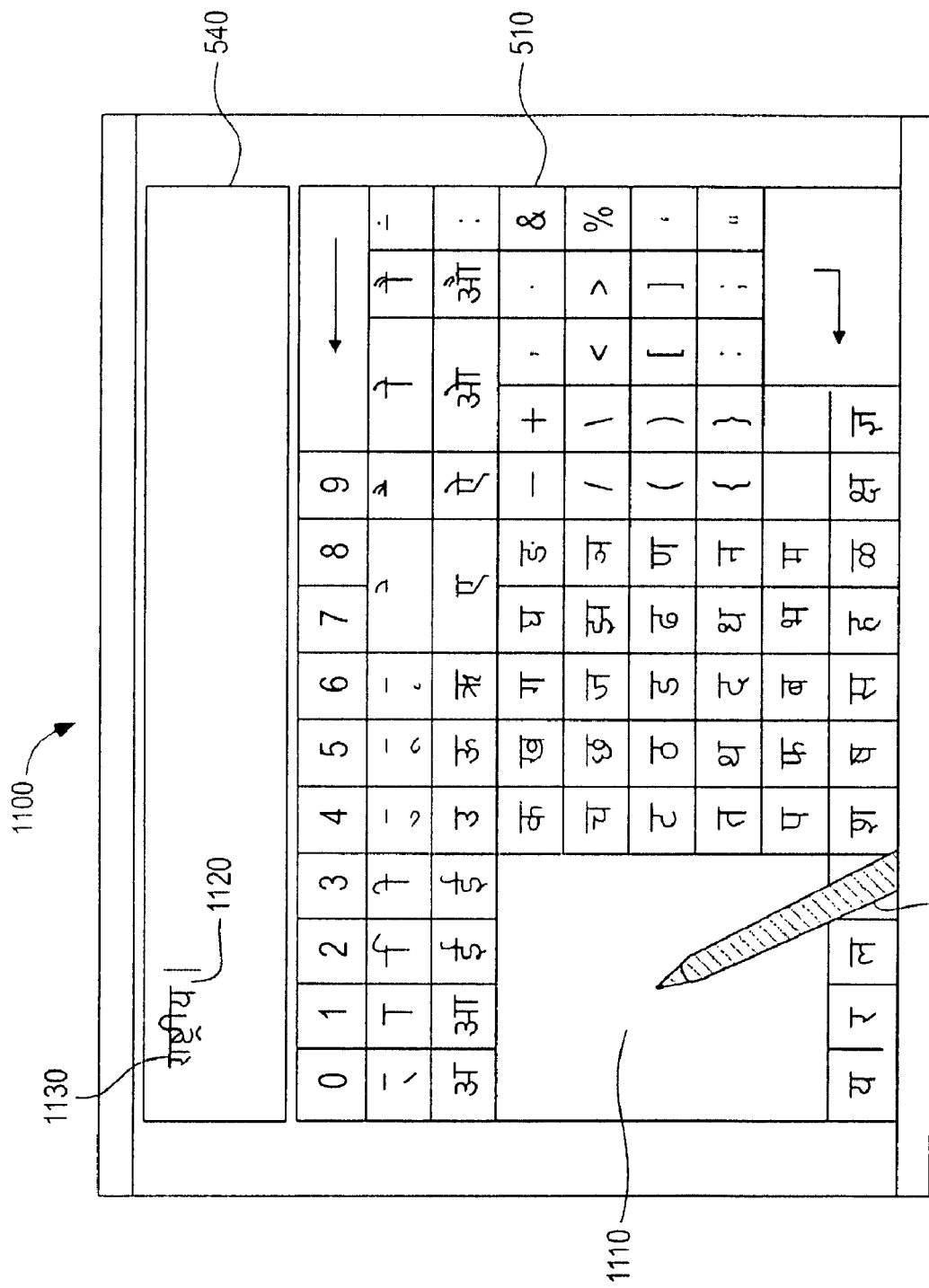

Referring now to FIG. 11, there is illustrated a screen shot 1100 of selecting a space character 1110 using the stylus 520 on the gestureboard 510 to input a space character into the gesture-keypad-engine (not shown) to produce a space character after completing the formation of the word 1130 using the above-described acts 410-480. Also shown in FIG. 11, is the displaying of the produced space character 1120 after the completion of the formation of the word 1130. It can be envisioned that subsequent words can be formed similarly using the above-described syllable entry technique.

Although the flowcharts 100 and 400 includes acts 110-150 and 410-480, respectively, that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Various embodiments of the present invention can be implemented in software, which may be run in the environment shown in FIG. 12 (to be described below) or in any other suitable computing environment. The embodiments of the present invention are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present invention may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 12:
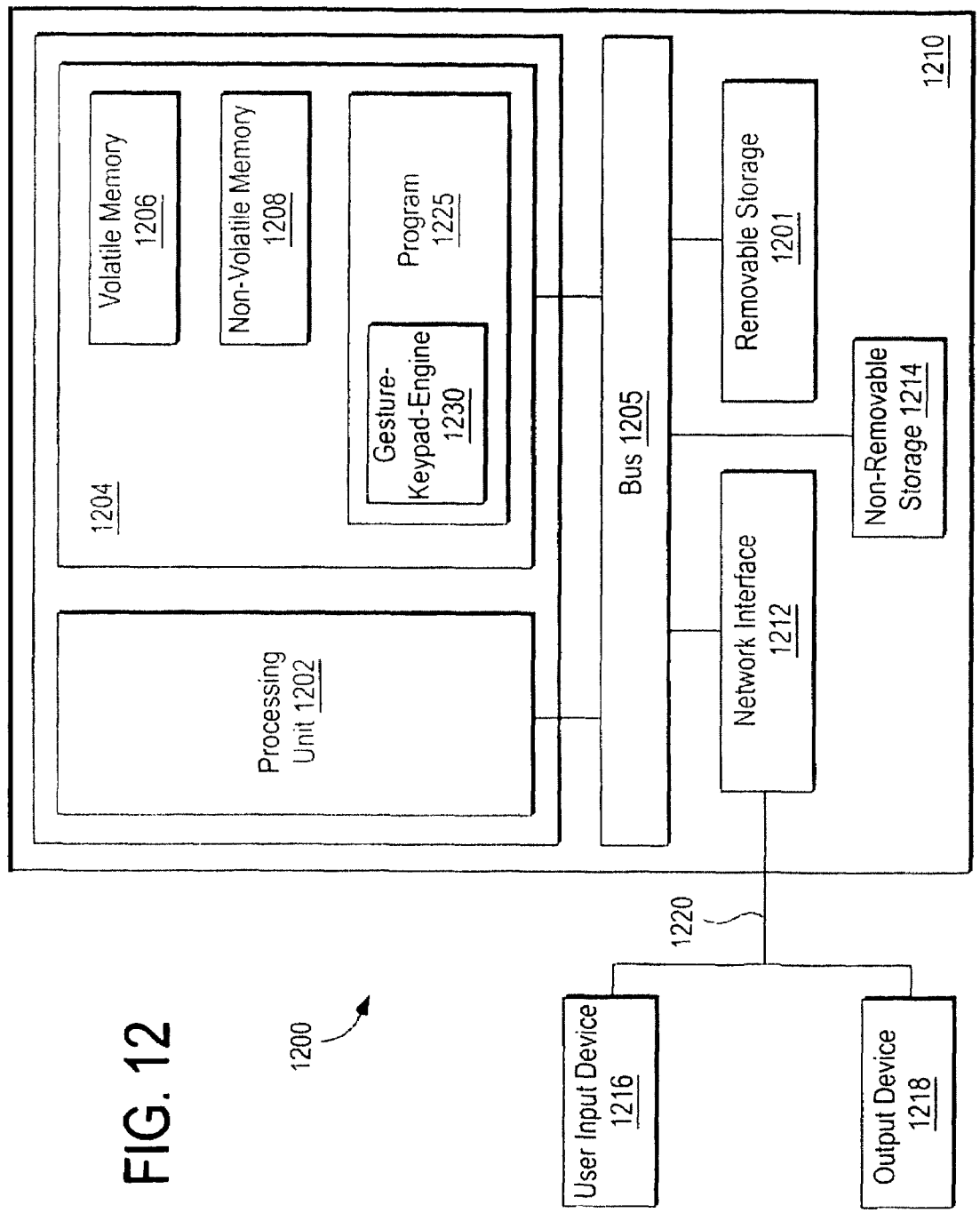
FIG. 12 is a block diagram of a typical computer system used for performing selected functions related to entering syllables according to an embodiment of the present invention, such as the one shown in FIGS. 1-11.

FIG. 12 shows an example block diagram 1200 of a suitable computing system environment for implementing embodiments of the present invention. FIG. 12 and the following discussion are intended to provide a brief, general description of a suitable computing environment in which certain embodiments of the inventive concepts contained herein may be implemented.

A general computing device, in the form of a computer 1210, may include a processing unit 1202, memory 1204, removable storage 1201, and non-removable storage 1214. Computer 1210 additionally includes a bus 1205 and a network interface (NI) 1212.

Computer 1210 may include or have access to a computing environment that includes one or more user input devices 1216, one or more output devices 1218, and one or more communication connections 1220 such as a network interface card or a USB connection. The user input devices may include a stylus and electronic tablet (digitizing tablet), touchpads, mice, joysticks, and keyboards. The output devices 1218 may include a computer monitor, TV screen, plasma display, LCD, and display on gestureboard. The computer 1210 may operate in a networked environment using the communication connection 1220 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 1204 may include volatile memory 1206 and non-volatile memory 1208. A variety of computer-readable media may be stored in and accessed from the memory elements of computer 1210, such as volatile memory 1206 and non-volatile memory 1208, removable storage 1212 and non-removable storage 1214. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 1202 of the computer 1210. For example, a computer program 1225 may comprise machine-readable instructions capable of inputting shapes and/or syllables from a script according to the teachings and herein described embodiments of the present invention. In one embodiment, the computer program 1225 may be included on a CD-ROM and loaded from the CD-ROM to a hard drive in non-volatile memory 1208. The machine-readable instructions cause the computer 1210 to display candidate shapes and/or syllables according to the various embodiments of the present invention. As shown in FIG. 12, the program 1225 includes a gesture-keypad-engine 1230 that receives associated data of selected shapes and/or syllables and produces candidate shapes and/or syllables.

In operation, a base character from a script with a large character set is selected using the user input device 1216. The selected base character is modified by entering one or more natural handwritten modifier strokes using the user input device 1216 to form a current desired shape and/or syllable. An associated digital data of the current desired shape and/or syllable is inputted into the gesture-keypad-engine 1230. The gesture-keypad-engine 1230 then produces a current candidate shape and/or syllable upon inputting the associated digital data. In some embodiments, the gesture-keypad-engine 1230 is responsive to the selected base character and the entered one or more natural handwritten modifier strokes. In these embodiments, the gesture-keypad-engine 1230, which is coupled to the user input device 1216 via the network interface 1212, produces the current candidate shapes and/or syllables upon completion of the entering of the one or more natural handwritten modifier strokes. The produced current candidate shape and/or syllable is then displayed on the output device 1218. The technique of inputting shapes and/or syllables from a script having large the character set into a computer according to the various embodiments of the present invention is described in more detail with reference to FIGS. 1-11.

The syllable input technique of the present invention is modular and flexible in terms of usage in the form of a "Distributed Configurable Architecture". As a result, parts of the apparatus may be placed at different points of a network, depending on the model chosen. For example, the gesture-keypad-engine can be deployed in a server and the input and output devices streamed over from a client to the server and back, respectively. The syllable gesture-keypad-engine can also be placed on each client, with the database management centralized. Such flexibility allows faster deployment to provide a cost effective solution to changing business needs.

The above description is intended to be illustrative, and not restrictive. Many other embodiments will be apparent to those skilled in the art. The scope of the invention should therefore be determined by the appended claims, along with the full scope of equivalents to which such claims are entitled.

The above-described methods, apparatus, and system empower the non-English speaking masses to overcome the language barriers and move towards creating a "universally accessible digital environment". In addition, the above-described technique makes existing applications easier to use in native scripts. The above-described technique is practical and natural way to "input" phonetic scripts, such as Indic, Arabic, Pali and the like.

The above-described methods and apparatus provide various embodiments for syllable input into a computer. It is to be understood that the above-description is intended to be illustrative, and not restrictive. Many other embodiments will be apparent to those of skill in the art upon reviewing the above-description. The system and method of the present invention is adaptable to a variety of applications and many types of devices. Thus, mobile phones, PDAs, handheld PCs, laptop computers, and many other small devices can take advantage of character input according to the various embodiments of the present invention. The scope of the subject matter should, therefore, be determined with reference to the following claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described above with respect to the methods illustrated in FIGS. 1 and 4 can be performed in a different order from those shown and described herein.

FIGS. 1-12 are merely representational and are not drawn to scale. Certain proportions thereof may be exaggerated, while others may be minimized. FIGS. 1-12 illustrate various embodiments of the invention that can be understood and appropriately carried out by those of ordinary skill in the art.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of the embodiments of the invention, with each claim standing on its own as a separate preferred embodiment.

The invention claimed is:

1. A method comprising:
   locating a base shape from a set of shapes using a digitizing tablet;
   drawing one or more modifying gestures substantially around the located base shape using the digitizing tablet to form a desired shape, wherein the one or more modifying gestures includes at least one of phonetic modifiers and half consonant modifiers;
   inputting an associated data of the formed desired shape upon completion of the drawing of the one or more modifying gestures into a gesture-keypad-engine via the digitizing tablet;
   producing a candidate shape by the gesture-keypad-engine; and
   outputting the candidate shape.

2. The method of claim 1, wherein, in locating a base shape, the digitizing tablet comprises an electronic tablet and a pen.

3. The method of claim 1, wherein, in outputting the candidate shape, the output is selected from the group consisting of transmitting, printing, and displaying.

4. A method for inputting syllables into a computer comprising:
- locating a base character from a set of characters using a digitizing tablet;
- modifying the base character with one or more natural handwritten modifying gestures using the digitizing tablet to form a current desired syllable, wherein the one or more natural handwritten modifying gestures includes at least one of phonetic modifiers and half consonant modifiers;
- inputting an associated data of the formed current desired syllable upon completion of the one or more natural handwritten modifying gestures into a gesture-keypad-engine via the digitizing tablet, wherein the gesture-keypad-engine producing a current candidate syllable; and
- displaying the produced current candidate syllable on a display device.

5. The method of claim 4, further comprising:
- repeating the above steps to form a next desired syllable; and
- displaying the next candidate syllable along with the current candidate syllable such that the current candidate syllable is cursively connected to the next candidate syllable.

6. The method of claim 5, further comprising:
- repeating the above steps until a current desired word is formed.

7. The method of claim 6, wherein modifying the base character with one or more natural handwritten modifying gestures using the digitizing tablet to form a current desired syllable comprises:
- determining whether one or more modifying gestures needed to form the current desired syllable;
- if not, gesturing to select the base character and inputting the selected base character into the gesture-keypad-engine, wherein the gesture-keypad-engine producing a candidate syllable;
- if so, drawing a first modifying gesture substantially over and around the base character to produce a first desired syllable;
- determining whether the drawn first modifying gesture is a valid modifying gesture;
- if so, inputting the first modifying gesture along with the selected base character into the gesture-keypad-engine, wherein the gesture-keypad-engine producing a first candidate syllable;
- determining whether a second modifying gesture is needed to form the desired current syllable;
- if so, repeating the above steps to input the second modifying gesture; and
- if not, displaying the current candidate syllable on the display device.

8. The method of claim 4, wherein the characters are selected from the group consisting of vowels, consonants, consonant modifiers, vowel modifiers, numerals, and special characters.

9. The method of claim 4, wherein, in displaying, the display device is a device selected from the group consisting of a computer monitor, TV screen, plasma display, LCD, display on an electronic tablet.

10. The method of claim 4, wherein, in selecting the base character from the set of characters using the digitizing tablet, the digitizing tablet comprises an electronic tablet and a pen.

11. A method for inputting syllables of a phonetic script into a computer comprising:
- selecting a character from a set of characters associated with the phonetic script using a digitizing tablet to form a word;
- determining whether one or more modifying gestures are needed for the selected character to form a desired syllable, wherein the one or more modifying gestures includes at least one of phonetic modifiers and half consonant modifiers;
- if the one or more modifying gestures are needed for the selected character, modifying the selected character by drawing the one or more modifying gestures substantially over and around the selected character to form a current desired syllable using the digitizing tablet;
- inputting the desired syllable data into a gesture-keypad-engine upon completion of the drawing using the digitizing tablet, wherein the gesture-keypad-engine producing a current candidate syllable;
- displaying the produced current candidate syllable on a display device;
- determining whether a next syllable is needed to form the word;
- if so, repeating the above steps; and
- if not, entering a blank space and proceeding to form a new word by repeating the above steps.

12. The method of claim 11, further comprising:
- if the one or more modifying gestures are not needed for the selected character, inputting an associated data of the selected base character into the gesture-keypad-engine, wherein the gesture-keypad-engine producing a current candidate syllable;
- displaying the produced current candidate syllable on a display device;
- determining whether a next syllable is needed to form the word;
- if so, repeating the above steps to form a next desired syllable; and
- if not, stopping selection of the next desired syllable.

13. The method of claim 12, further comprising:
- displaying the next candidate syllable along with the current candidate syllable such that current candidate syllable is cursively connected to the next candidate syllable.

14. An article comprising:
- a non-transitory computer readable storage medium having instructions that, when executed by a computing platform, result in execution of a method comprising:
- locating a base character from a set of characters using a digitizing tablet;
- modifying the base character with one or more natural handwritten modifying gestures using the digitizing tablet to form a current desired syllable, wherein the one or more natural handwritten modifying gestures includes at least one of phonetic modifiers and half consonant modifiers;
- inputting an associated data of the formed current desired syllable upon completion of the one or more natural handwritten modifying gestures into a gesture-keypad-engine via the digitizing tablet, wherein the gesture-keypad-engine producing a current candidate syllable; and
- displaying the produced current candidate syllable on a display device.

15. An apparatus comprising:
- a digitizing tablet that locates a character from a set of characters and modifies the located character by drawing one or more natural handwritten modifier strokes to form a desired syllable, wherein the one or more natural handwritten modifier strokes includes at least one of phonetic modifiers and half consonant modifiers;
- a gesture-keypad-engine coupled to the digitizing tablet that is responsive to the located character and the drawn one or more natural handwritten modifier strokes, wherein the gesture-keypad-engine produces a current candidate syllable upon completion of the drawing of the one or more natural handwritten modifier strokes; and
- a display device coupled to the gesture-keypad-engine that displays the produced current candidate syllable.

16. The apparatus of claim 15, wherein the digitizing tablet comprises a stylus and an electronic tablet.

17. The apparatus of claim 16, wherein the electronic tablet has a flat surface with a defined active area, wherein the defined active area has a map of a gestureboard including characters from a desired script having a large character set, wherein an user locates a character by placing the stylus over one of the characters on the gestureboard, and wherein the user draws the one or more natural handwritten modifier strokes around the located character to form the current desired syllable and upon completion of the drawing of the one or more natural handwritten modifier strokes the electronic tablet sends digital data associated with the formed current desired syllable to the gesture-keypad-engine.

18. The apparatus of claim 15, wherein the display device is a device selected from the group consisting of computer monitor, TV screen, plasma display, LCD, and display on a gestureboard.

* * * * *